(12) United States Patent
Veligdan

(10) Patent No.: US 6,741,779 B2
(45) Date of Patent: May 25, 2004

(54) HIGH CONTRAST FRONT PROJECTION DISPLAY PANEL AND A METHOD OF MAKING A HIGH CONTRAST FRONT PROJECTION DISPLAY PANEL

(75) Inventor: James T. Veligdan, Manorville, NY (US)

(73) Assignee: Scram Technologies, Inc., Dunkirk, MD (US)

( * ) Notice: Subject to any disclaimer, the term of this patent is extended or adjusted under 35 U.S.C. 154(b) by 0 days.

(21) Appl. No.: 10/389,398

(22) Filed: Mar. 14, 2003

(65) Prior Publication Data
US 2003/0174979 A1 Sep. 18, 2003

Related U.S. Application Data

(62) Division of application No. 09/737,732, filed on Dec. 15, 2000, now Pat. No. 6,535,674.

(51) Int. Cl.[7] .................................................. G02B 6/04
(52) U.S. Cl. ....................................................... 385/120
(58) Field of Search ................................. 385/120, 134, 385/135, 136, 137, 141

(56) References Cited

U.S. PATENT DOCUMENTS

| | | |
|---|---|---|
| 3,253,500 A | 5/1966 | Hicks, Jr. |
| 3,874,783 A | 4/1975 | Cole |

(List continued on next page.)

OTHER PUBLICATIONS

Veligdan, "Unique Interactive Projection Display Screen", Sep. 29, 1997, 7 pages.

Beiser, et al., "Ten Inch Planar Optic Display", Proceedings of the International Society for Optical Engineering (SPIE), vol. 2734, Apr. 1996, 9 pages.

Yoder, "The State-of-the-Art in Projection Display: An Introduction of the Digital Light Processing DLP", Texas Instruments Web Site, Mar. 1997, 5 pages.

DeSanto, et al., "Polyplanar Optical Display Electronics", Proceedings of the International Society (SPIE), vol. 3057, Apr. 1997, 12 pages.

*Primary Examiner*—Javaid H. Nasri
(74) *Attorney, Agent, or Firm*—Reed Smith LLP; William J. McNichol, Jr.; Matthew J. Esserman

(57) ABSTRACT

An optical display panel which provides improved viewing contrast for front projection applications, and a method of producing a stacked optical waveguide panel for front projection applications, are disclosed. The optical panel includes a plurality of stacked optical waveguides, wherein each waveguide has a back face and an outlet face at opposing ends of each waveguide, and wherein each waveguide is formed of a core between an opposing pair of cladding layers, and at least one reflector connected to the back face of at least one waveguide, wherein the at least one reflector receives image light incident through at least one waveguide from the outlet face, and wherein the at least one reflector redirects the image light back through the at least one waveguide out of the outlet face. In the preferred embodiment, the outlet face is rendered black by inclusion of black within or between cladding layers. The method includes stacking a plurality of clear strips of plastic, placing a double sided, dark colored adhesive between each strip of plastic, pressing the stack, forming, at two opposite ends of the stack, a back face and an outlet face, and connecting at least one reflector to the back face.

49 Claims, 6 Drawing Sheets

U.S. PATENT DOCUMENTS

| | | |
|---|---|---|
| 4,116,739 A | 9/1978 | Glenn |
| 4,344,668 A | 8/1982 | Gunther et al. |
| 4,418,986 A | 12/1983 | Yata et al. |
| 4,469,402 A | 9/1984 | Yata et al. |
| 4,511,215 A | 4/1985 | Butler |
| 4,586,781 A | 5/1986 | Gunther et al. |
| 4,668,869 A | 5/1987 | Matosian et al. |
| 4,674,836 A | 6/1987 | Yata et al. |
| 5,066,947 A | 11/1991 | Du Castel |
| 5,274,406 A | 12/1993 | Tejima et al. |
| 5,381,502 A | 1/1995 | Veligdan |
| 5,422,691 A | 6/1995 | Ninomiya et al. |
| 5,455,882 A | 10/1995 | Veligdan |
| 5,481,385 A | 1/1996 | Zimmerman et al. |
| 5,521,725 A | 5/1996 | Beeson et al. |
| 5,625,736 A | 4/1997 | Veligdan |
| 5,642,194 A | 6/1997 | Erskine |
| 5,642,449 A | 6/1997 | Phillips |
| 5,668,907 A | 9/1997 | Veligdan |
| 5,684,905 A | 11/1997 | Sugawara et al. |
| 5,716,118 A | 2/1998 | Sato et al. |
| 5,764,845 A | 6/1998 | Nagatani et al. |
| 5,828,427 A | 10/1998 | Faris |
| 5,841,496 A | 11/1998 | Itoh et al. |
| 5,914,760 A | 6/1999 | Daiku |
| 5,940,565 A | 8/1999 | Sugawara |
| 6,002,826 A | 12/1999 | Veligdan |
| 6,012,816 A | 1/2000 | Beiser |
| 6,031,954 A | 2/2000 | Higuchi |
| 6,215,920 B1 | 4/2001 | Whitehead et al. |
| 6,285,426 B1 | 9/2001 | Akins et al. |

HIGH CONTRAST FRONT PROJECTION DISPLAY PANEL AND A METHOD OF MAKING A HIGH CONTRAST FRONT PROJECTION DISPLAY PANEL

CROSS REFERENCE TO RELATED APPLICATIONS

The application is a divisional of U.S. patent application Ser. No. 09/737,732, filed Dec. 12, 2000, issuing on Mar. 18, 2003 as U.S. pat. No. 6,535,674.

BACKGROUND OF THE INVENTION

1. Field of the Invention

The present invention is directed generally to a planar optical display, and, more particularly, to a high contrast front projection display panel and a method of making a high contrast front projection display panel.

2. Description of the Background

Video display screens typically use cathode ray tubes (CRTs) for projecting an image onto the outlet face of the screen. A typical screen of this type has a width to height ratio of 4:3 with 525 vertical lines of resolution. An electron beam must be scanned both horizontally and vertically on the screen to form a number of pixels, which collectively form the image. Conventional cathode ray tubes have a practical limit in size and are relatively deep to accommodate the required electron gun. Larger screen televisions are available which typically include various forms of image projection for increasing the screen image size. However, such screens may experience limited viewing angle, limited resolution, decreased brightness, and decreased contrast, particularly in display screens using front projections. This is, in part, due to the use of white screens to allow the screen to reflect the front projection back to the user. Thus, because the screen is white, the darkest black level that can be displayed is "screen white", the color of the screen when the projection is off, due to the fact that black light cannot be projected. Consequently, the projection must be either on, or off, to produce white, or black, respectively. Thus, where black is viewed on a front screen projection system, the viewer is actually seeing the white of the background, i.e the absence of projected light, which the human eye sees as black in the context of the white light projected elsewhere on the background, meaning that the presence of the optical spectrum projected onto the white background forms a "whiter than white" color, which the eye sees as white. This is the reason that a room must be darkened in order for a viewer to see black on a front projection screen.

Optical panels can be created using a plurality of stacked waveguides, and may be rendered black using at least one black cladding layer between transparent cores of the waveguides. The cladding layers disclosed therein have a lower index of refraction than the waveguide cores for effectuating substantial internal reflection of the image light channeled through the cores, and thereby improve contrast, i.e. thereby improve the appearance of black images on a screen. Such optical panel displays have typically been operated in a rear projection mode.

Therefore, the need exists for a display panel that allows for front projection, while also providing the appearance of a black screen to improve viewing contrast and to eliminate the need to dim lights in order to allow a viewer to see black images.

BRIEF SUMMARY OF THE INVENTION

The present invention is directed to an optical display panel which provides improved viewing contrast for front projection applications. The optical panel includes a plurality of stacked optical waveguides, wherein each waveguide has a back face and an outlet face at opposing ends of each waveguide, and wherein each waveguide is formed of a core between an opposing pair of cladding layers, and at least one reflector connected to the back face of at least one waveguide, wherein the at least one reflector receives image light incident through at least one waveguide from the outlet face, and wherein the at least one reflector redirects the image light back through the at least one waveguide out of the outlet face. In the preferred embodiment, the outlet face is rendered black by inclusion of black within or between cladding layers.

The present invention is also directed to a method of producing a stacked optical waveguide panel for front projection applications. In one preferred embodiment of the present invention, clear strips of plastic, which are preferably approximately ¾" by 40", and approximately $^{20}/_{1000}$" thick, are stacked, with a thin double sided black adhesive strip between each plastic strip. The stack may include 2000–3000 of the strips. The strip stack is then pressed under high pressure to eliminate air bubbles and improve adhesion. Another method includes coating a plurality of glass sheets on each of two faces with a first substance having an index of refraction lower than that of the glass sheets, placing a first coated glass sheet into a trough sized slightly larger than the first coated glass sheet, filling the trough with a thermally curing black epoxy, stacking the plurality of coated glass sheets within the filled trough, curing the epoxy, forming, at two opposite ends of the stack, a back face and an outlet face, and connecting at least one reflector to the back face.

The optical display panel for front projection applications solves problems experienced in the prior art by providing a display panel that allows for front projection, while also providing the appearance of a black screen to improve viewing contrast and to eliminate the need to dim lights in order to allow a viewer to see black images.

BRIEF DESCRIPTION OF THE SEVERAL VIEWS OF THE DRAWINGS

For the present invention to be clearly understood and readily practiced, the present invention will be described in conjunction with the following figures, wherein:

FIG. 5 illustrates, in detail, the reflection of light in a high contrast front projection display panel.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical optical display panel. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
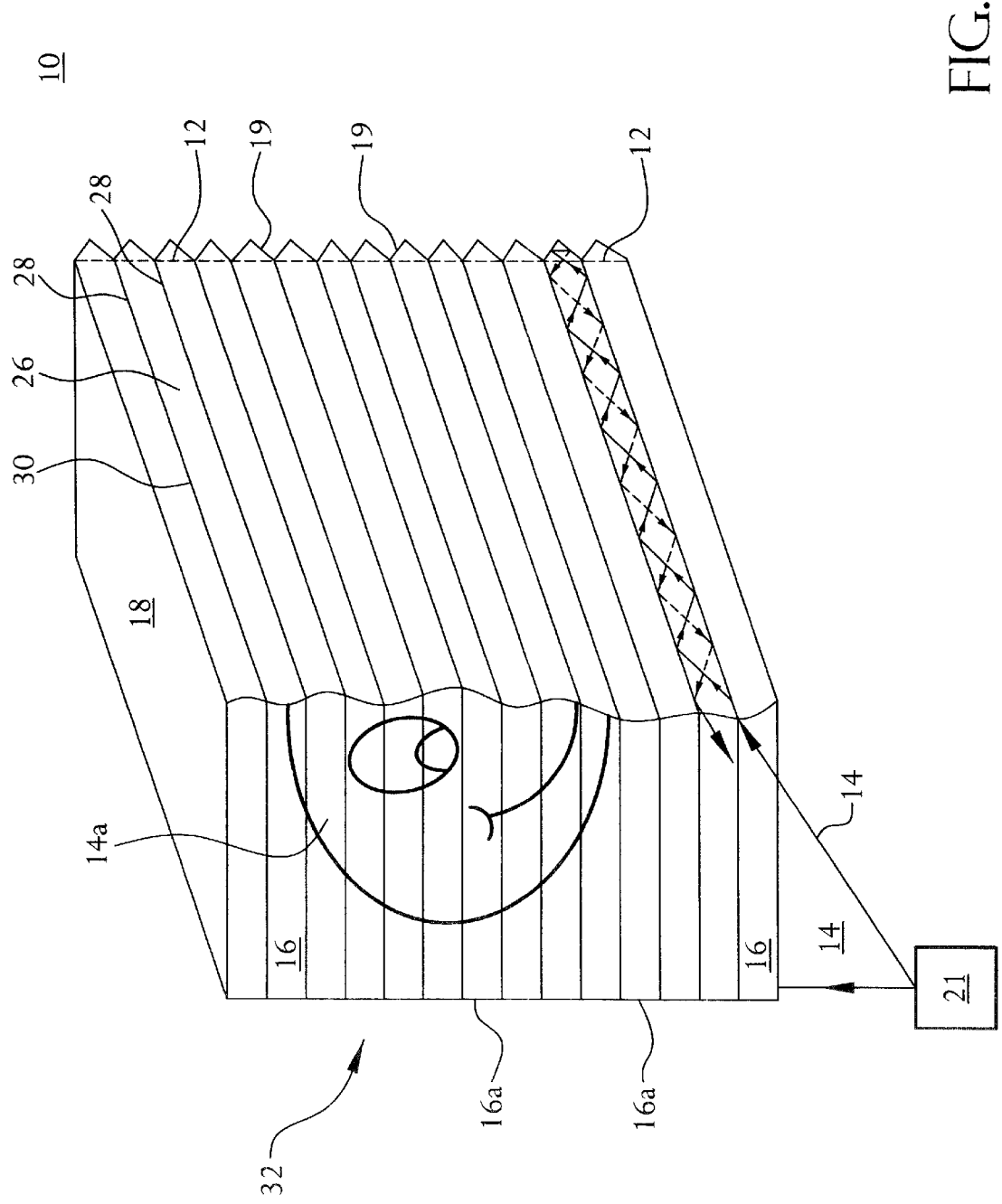
FIG. 1 is an isometric view illustrating a cross section of a high contrast front projection display panel.

FIG. 1 is an isometric view schematic illustrating a display panel 10. The display panel 10 may include a plurality of stacked optical waveguides 16a, an outlet face 16 at one end of a body 18 formed by the plurality of stacked waveguides 16a, a back face 12 at a second end of the body 18, at least one reflector 19 that reflects light within the body 18 at the back face 12, and a light generator 21.

The body 18 is preferably solid and receives light 14 along the surface of the outlet face 16. The light 14 is passed through the body 18 after entering the outlet face 16, and is reflected back through the body 18 from the at least one reflector 19 to the outlet face 16. In a preferred embodiment of the present invention, the body 18 is formed of the length, height, and width of the plurality of stacked waveguides 16a.

The plurality of stacked waveguides 16a forms the body 18 of the panel 10, forms at one end of the stack 16a the back face 12, and at a second end the outlet face 16. The waveguides 16a may be formed of any material known in the art to be suitable for passing electromagnetic waves therethrough, such as, but not limited to, plastics, or glass. The preferred embodiment of the present invention is implemented using individual glass or plastic or polymer sheets, which are typically approximately 0.010–0.020" thick, and which may be of a manageable length and width. The polymer used may be a suitable plastic laminate, such as Lexan®, which is commercially available from the General Electric Company®, or any polymers or acrylics, such as Plexiglass.

The waveguides 16a are in the form of sheets or ribbons extending the full width of the outlet face 16 and are stacked to collectively form at their upper ends the height of the outlet face 16. The waveguides 16a are disposed along their longitudinal light transmitting axes. The number of waveguides 16a may be selected for providing a corresponding vertical resolution of the outlet face 16. For example, 525 of the waveguides 16a may be stacked to produce 525 lines of vertical resolution in the outlet face 16. Since the waveguides 16a extend the full width of the outlet face 16, horizontal resolution may be controlled by horizontal modulation of the image light 14.

Each of the plurality of waveguides includes a central core 26 for channeling the image light 14 through the waveguides, and each core 26 is disposed between cladding layers 28. In a preferred embodiment of the present invention, the cladding layers 28 extend completely from the back face 12 to the outlet face 16 along the entire width of the outlet face 16. A black layer 30 may be disposed within or between adjoining cladding layers 28 for absorbing ambient light 32 at the outlet face 16, and may form multi-layer cladding layers 28. The term black is used herein to encompass not only pure black color, but additionally, any functionally comparable dark color suitable for use in the present invention, such as dark blue. The black layer 30 is only necessary within the viewable region of the outlet face, but, in a preferred embodiment of the present invention, the black layer 30 extends completely from the back face 12 to the outlet face 16 along the entire width of the outlet face 16. Additionally, the cladding layers 28 may be formed of gradients.

Each central core 26 has a first index of refraction. The cladding layers 28 have a second index of refraction, lower than that of the central core 26, for ensuring total internal reflection of the image light 14 as it travels from the outlet face 16 to the back face 12, and back to the outlet face 16. The core is thus bi-directional. In a preferred embodiment of the present invention, the cladding layers 28 are transparent in order to effectuate total internal reflection of the image light 14, and thereby maximize the brightness of the light 14 at the outlet face 16. The black layers 30, if separate from the cladding layers, may have any index of refraction.

The back face 12 and outlet face 16 are formed by the plurality of waveguides 16a, wherein one end of each waveguide 16a forms a back face for that waveguide, and wherein the opposite end of each waveguide 16a forms an outlet for that waveguide 16a. Each waveguide 16a extends horizontally, and the plurality of stacked waveguides 16a extends vertically. The light 14 may be displayed on the outlet face in a form such as, but not limited to, a video image 14a. Consequently, in a preferred embodiment the plurality of waveguides 16a are stacked approximately parallel to the horizontal, thus placing the outlet face 16 and the back face 12 in the same plane from the horizontal and approximately equidistant from the horizontal.

The outlet face 16 is formed by the plurality of stacked optical waveguides 16a. The outlet face 16 is at one end of the body 18, and receives light 14 from the light generator 21. In the preferred embodiment, this light 14 is incident to the outlet face 16 at the critical angle or lower of the waveguide 16a, thus allowing for total internal reflection of the light within the waveguide 16a, thereby allowing for approximately all light projected from the light generator 21 to reach the back face 12. The outlet face 16 is defined as the front of the body 18. Additionally, the panel 10 has a height from the top to the bottom of the outlet face 16, and a width from the left to the right of the outlet face 16. The width and height may be selected to produce width to height aspect ratios of 4:3 or 16:9, for example, for use in a typical television application.

The light generator 21 generates light 14 and passes the light to outlet face 16. The light generator 21 may be a white light projector, such as an overhead projector, or may include a light source, and/or a light modulator, and/or imaging optics, such as a video or movie projector. The light 14 may be initially generated, for example, by the light source. The light source may be, for example, a bright incandescent bulb, a laser, an arc lamp, an LED, an RF excited gas discharge lamp, any solid state light source, or any phosphorescent, luminescent, or incandescent light source. The light 14 from the source may then be modulated by the modulator for defining individual picture elements, known in the art as pixels. Alternatively, the light may define a simple lighted item, such as an on/off switch. The imaging optics may include light folding mirrors or lenses. The imaging optics may be optically aligned between the outlet face 16 and the light modulator for compressing or expanding and focusing the light 14 as required to fit the outlet face 16. The light 14, after entry into the outlet face 16, travels through the panel body 18 to the back face 12, and reaches the at least one reflector 19. The light 14 is projected at the waveguide critical angle or lower over the outlet face 16, and is thus directed generally horizontally upon reflection from the at least one reflector 19 for projection outwardly from the outlet face 16.

Figure 2:
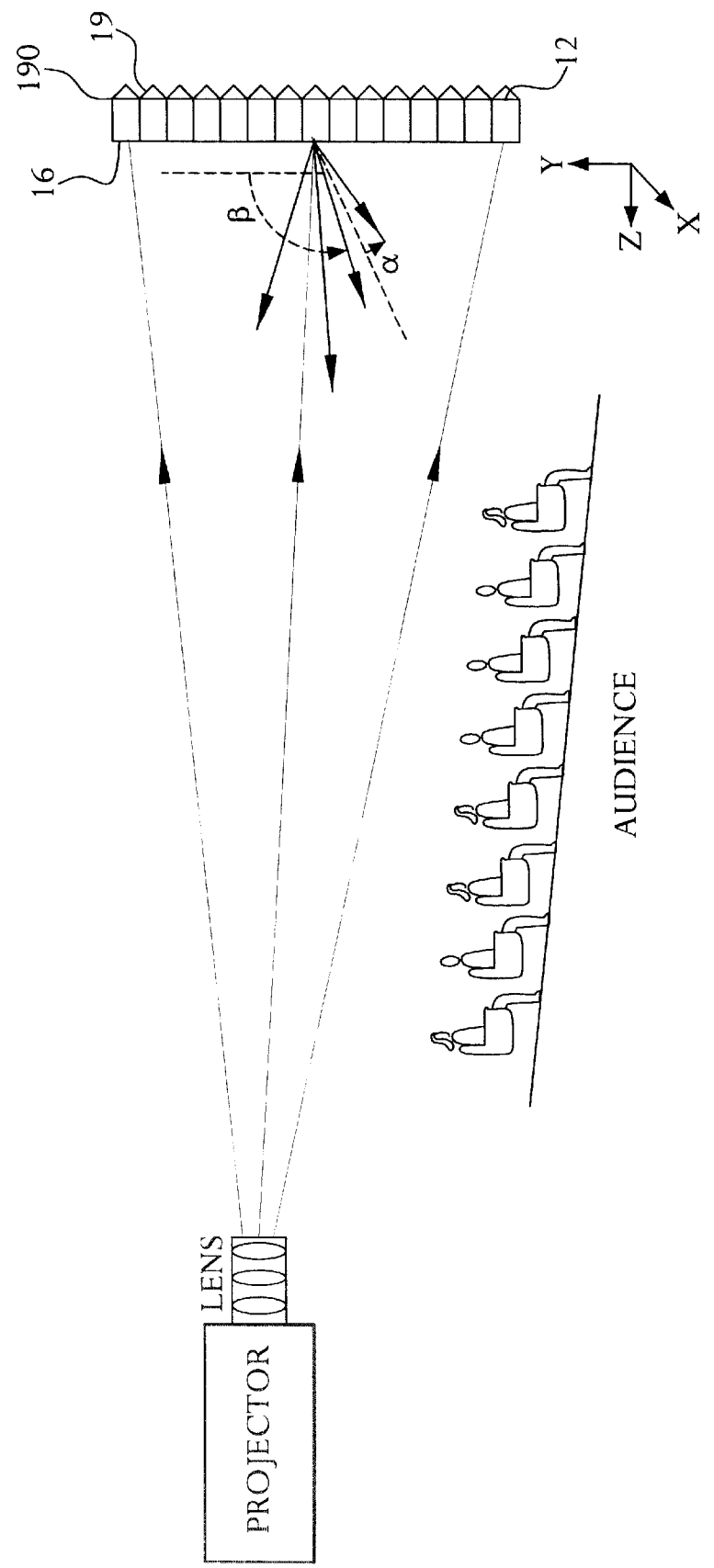
FIG. 2 illustrates the use of a high contrast front projection display panel for movie projection.

The at least one reflector 19 is connected to at least one of the back faces 12, or is embossed into at least one of the back faces 12, in order to redirect the light 14, which is incident in a direction generally horizontally inward through the body 18 from the outlet face 16, back to a direction generally horizontally outward from the outlet face 16. The at least one reflector may be within, pressed into, or without, the body 18 at the back face 12. The at least one reflector may be connected to the back face 12 by an optical connection (via, for example, element 190 in FIG. 2), being placed directly adjacent to the back face, or being glued to the back face (again, see element 190 for example), with or without air gaps, for example. The reflective portion of the reflector 19 may be, but is not limited to, a mirrored surface, such as a retro-reflector, a total internal reflection (TIR) retro-reflector, a reflective serration, a reflective coating, such as a reflective tape, a lens or series of lenses, a micro-lens or series of micro-lenses, a plane mirror, or a prism. Only light entering each waveguide 16a at the critical angle or lower reaches the back face reflector 19, as most ambient and other light will enter the waveguide 16a at an angle greater than the critical angle, and will consequently be absorbed by the cladding between the waveguides 16a, rather than being reflected from the outlet face 16 to the back face 19. Therefore, ambient and other light not entering the waveguide at the critical angle or lower will not be reflected by the at least one reflector 19 back to the outlet face 16, and light entering at the critical angle or lower will be so reflected. The at least one reflector may be a reflector 19 placed at the back face 12 of each waveguide 16a, when covered with the at least one reflector 19, causes reflection to occur back through the waveguide 16a and out the outlet face 16, or the at least one reflector 19 may cover several or all waveguide back faces 12 which constitute the body Additionally, in a preferred embodiment, the at least one reflector includes a diffuser or disperser to reflect incoming light out of the outlet face 16 at, for example, plus or minus 15 degrees from a horizontal axis of the outlet face 16 (shown in FIG. 2 as angle α) and plus or minus 60 degrees from a vertical axis of the outlet face 16 (shown in FIG. 2 as angle β). This dispersion allows for viewing by a much larger number of viewers, as those viewers can be off angle and, through the dispersion of the image light, still view the image. For example, as shown in FIG. 2, a movie projector may project a movie onto the outlet face 16, which movie is then reflected back out the outlet face 16, at a dispersed angle, to a wide viewing audience.

Figure 3B:
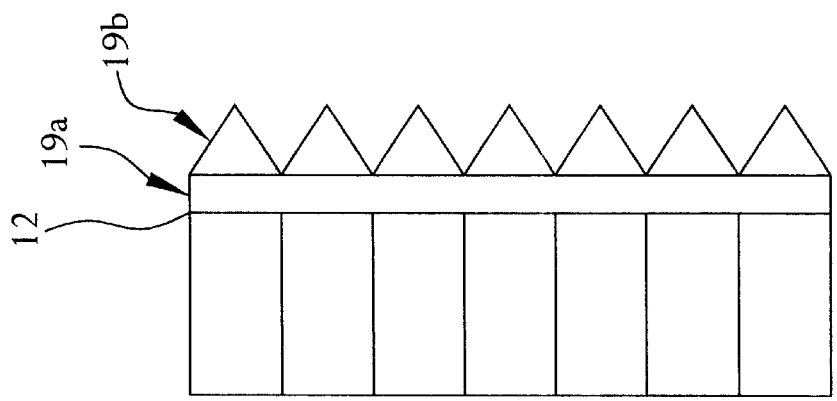
FIG. 3B is a cross sectional view of a high contrast front projection display panel having a planar diffusor and an angled reflective portion.
Figure 3A:
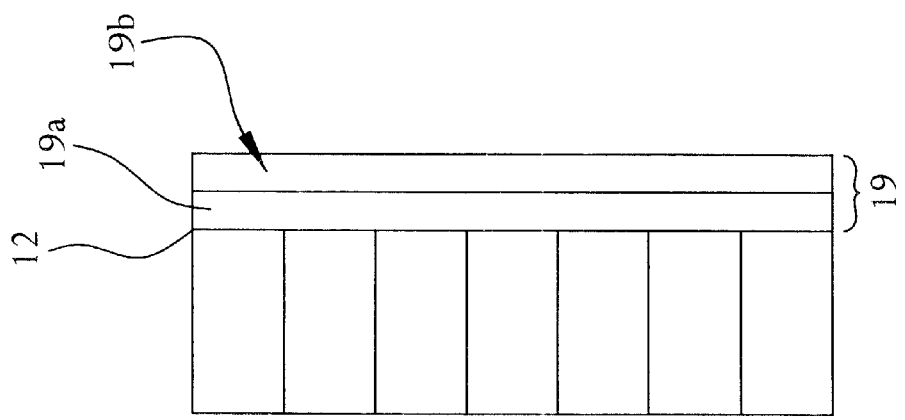
FIG. 3A is a cross sectional view of a high contrast front projection display panel having a planar diffusor and planar reflective portion.
Figure 3C:
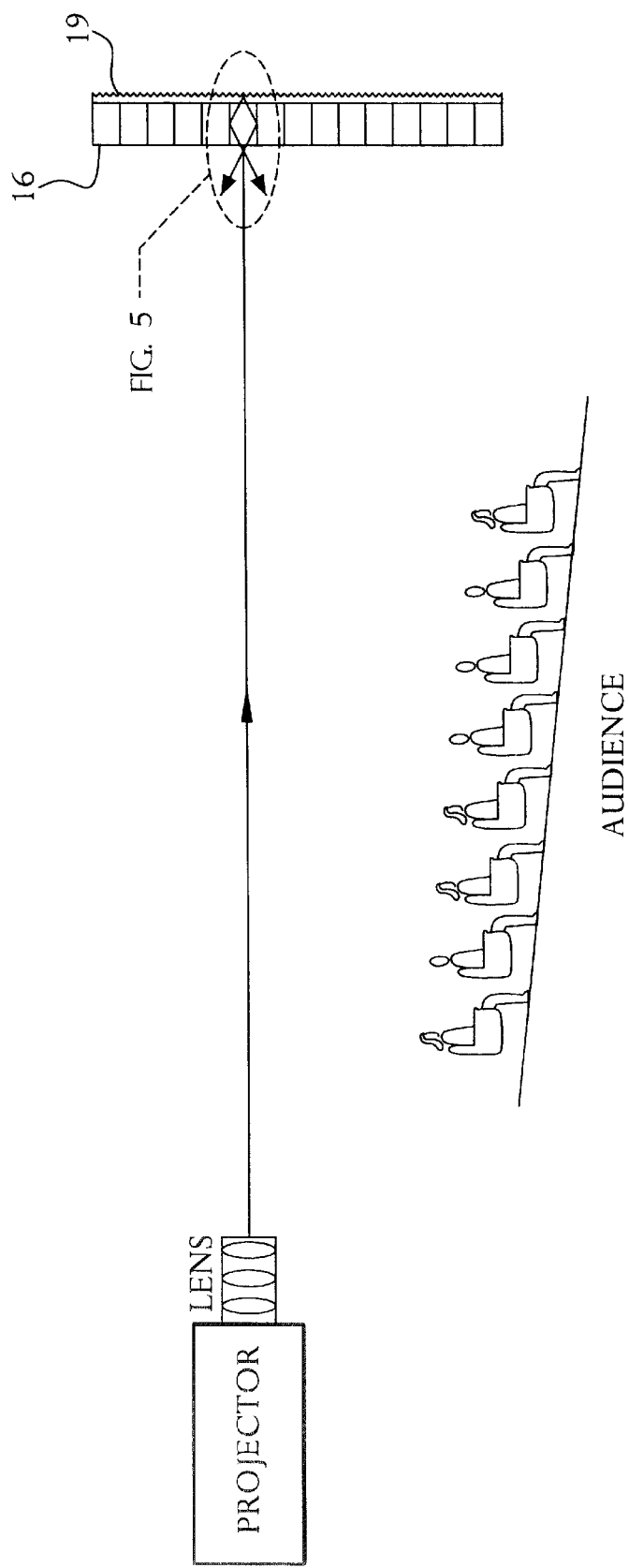
FIG. 3C illustrates the reflection of light in a high contrast front projection display panel.
Figure 5:
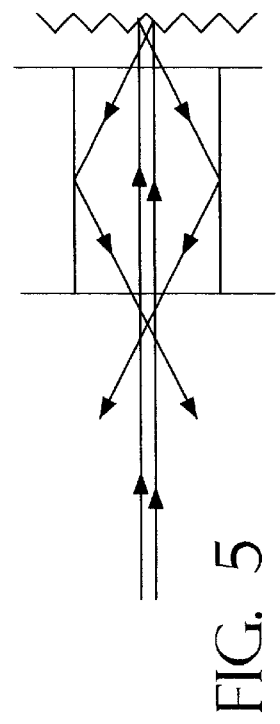
FIG. 5 is an enlarged illustration of the selected area in FIG. 3C.

The diffuser 19a may be attached to the reflective portion 19b of the reflector 19, between the reflective portion 19b and the at least one back face 12, as shown in FIG. 3A. The diffuser 19a may be planar in nature, as may be the reflective portion 19b, as shown in FIG. 3A, or the reflective portion 19b may be angled, and may be a retro-reflector, such as a TIR or mirrored surface, with a planar diffuser 19a between that angled reflective portion 19b and the at least one back end, as shown in FIG. 3B. In the embodiments of FIGS. 3A and 3B, horizontal spreading is preferably completely dependent on the diffuser 19a, while vertical spreading is dependent on the diffuser 19a and the waveguide absorption angle, as shown in FIG. 3C. The vertical and horizontal dispersion angles should thus be tailored to the audience location, and the diffuser angle of diffusion should be chosen accordingly.

Figure 3E:
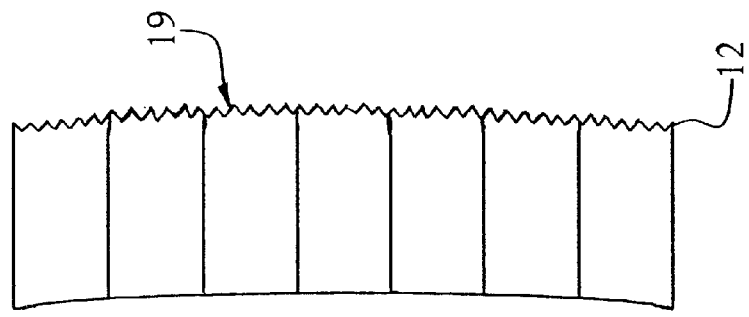
FIG. 3E is a cross sectional view of a high contrast front projection display panel having an embossed diffusive reflector.
Figure 3D:
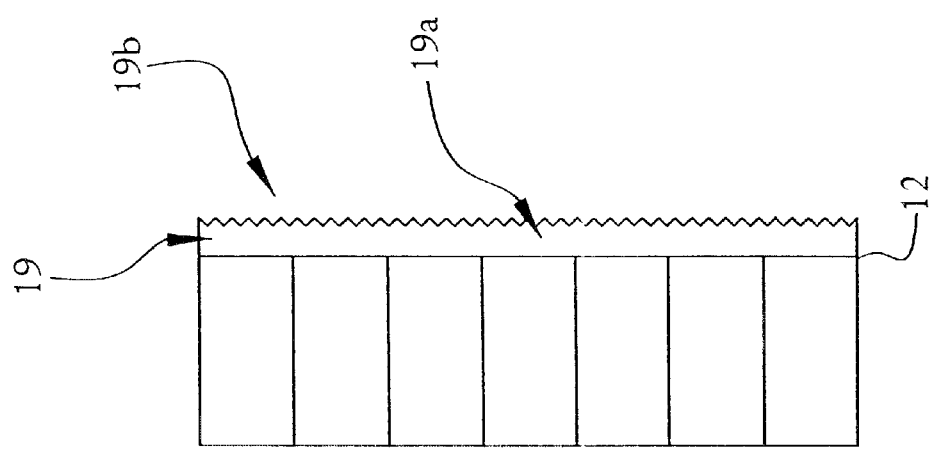
FIG. 3D is a cross sectional view of a high contrast front projection display panel having a diffusive reflector.

In an additional preferred embodiment shown in FIG. 3D, the reflector 19 is a diffusive mirror, which combines the reflective portion 19b and the diffusor 19a into a single element. The diffusive mirror may be a glass mirror or a plastic mirror, and includes the reflective portion 19b on the diffusive mirror at a plane farthest from the at least one back face 12. A diffusive microstructure is preferably present on the glass or plastic under the reflective portion 19a of the reflector 19. FIG. 3E illustrates the reflector 19 as an embossed reflective and/or diffusive microstructure, which is embossed directly onto the at least one back face 12.

Figure 4:
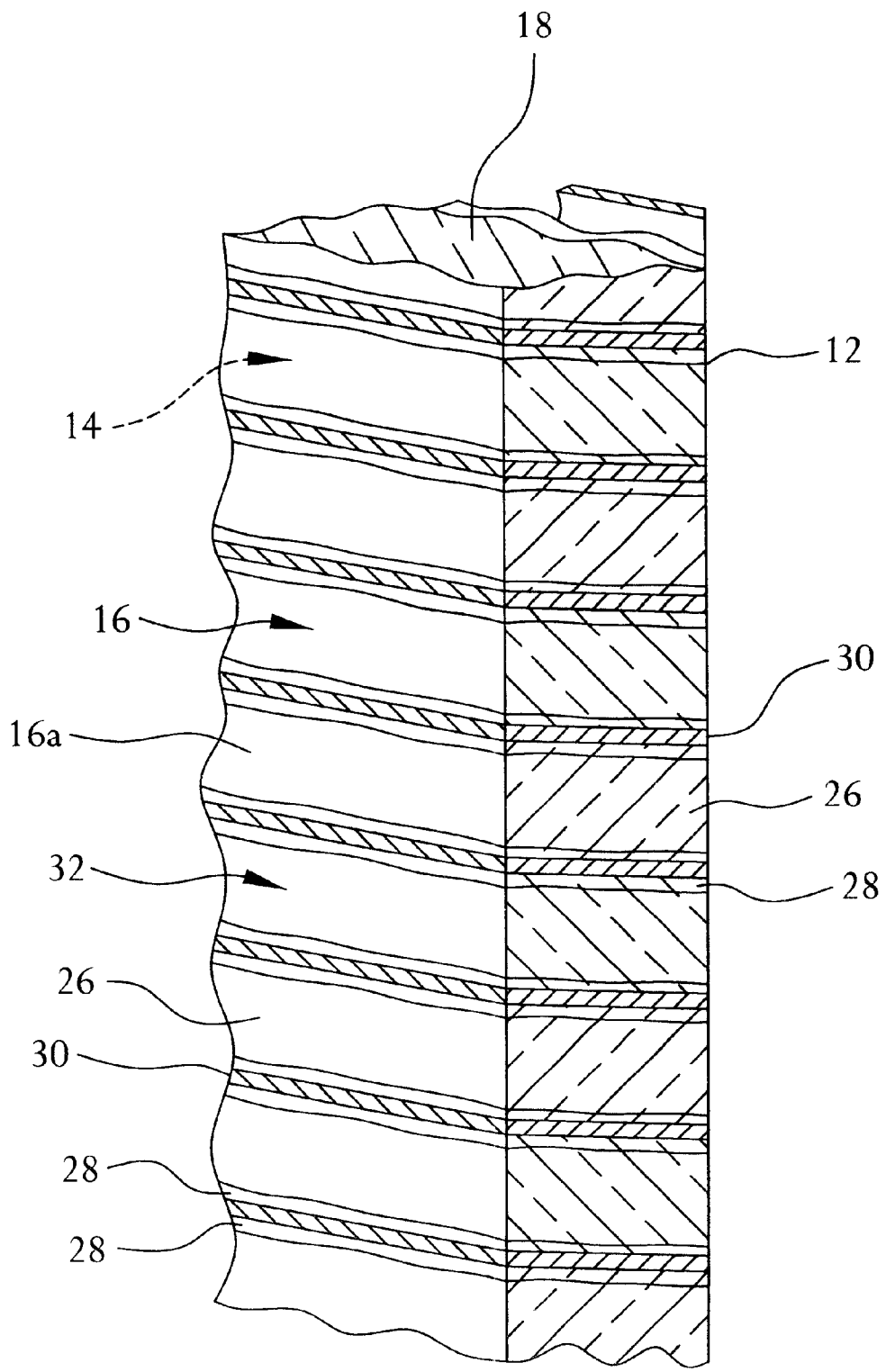
FIG. 4 is an isometric view illustrating a plurality of stacked waveguides.

The plurality of stacked waveguides 16a, including the at least one reflector, may be formed by several methods. The plurality of stacked waveguides is shown in FIG. 4. A plurality of glass sheets may be used as the central cores 26, and may be individually coated with, or dipped within, a clear, or black, substance having an index of refraction lower than that of the glass, such as, but not limited to, polyurethane, clear coat containing dyes, silicones, cyanoacreylates, low index refraction epoxys, plastics, and polymers, thereby forming a coated glass sheet. This clear or black substance is the opposed cladding layers 28. Where a clear cladding layer is placed, a first coated glass sheet may then be placed in a trough sized slightly larger than the first coated glass sheet. The trough may then be filled with a thermally curing black epoxy. The black epoxy need not possess the properties of a suitable cladding layer.

After filling of the trough with either clear coated sheets in a black epoxy, or black coated sheets in any epoxy, the coated glass sheets are repeatedly stacked, and a layer of epoxy forms between each coated glass sheet. The stacking is preferably repeated until between approximately 500 and 800 sheets have been stacked. Uniform pressure may then be applied to the stack, thereby causing the epoxy to flow to a generally uniform level between coated glass sheets. The stack may then be baked to cure at 80 degrees Celsius for such time as is necessary to cure the epoxy, and the stack is then allowed to cool slowly in order to prevent cracking of the glass.

The back face 12 and the outlet face 16 may be cut as planar or curved as desired, and the back face 12 may be specially shaped to form a desired shaped surface to allow for proper operation of the at least one reflector 19. The cut portions of the panel 10 may then be polished with a diamond polisher to remove any saw marks. The at least one reflector 19 is then added to the back face, either in the form of a coating placed on the back face or faces 12, a mirror, lens, or prism glued to the back face or faces 12, or a reflective attachment, such as a reflective tape, being fastened to the back face or faces 12.

In an additional preferred embodiment, clear strips of plastic, which are preferably approximately ¾" by 40", and approximately 20/1000" thick, are stacked, with a thin double sided black adhesive strip between each plastic strip. The stack may include 2000–3000 of the strips. The strip stack is then pressed under high pressure to remove air bubbles and increase adhesion. In one embodiment, the adhesive is Research AR8350, 1/1000" to 2/1000" thick black double sided adhesive. The adhesive may be shades other than black, such as dark blue, and preferably rolls out like a form of tape, in a plastic/adhesive/plastic/adhesive format. The pressure applied to the completed stack is preferably in excess of 1,000 pounds.

In a second embodiment of the present invention, the coated glass sheets or plastic strips may be coated with a black substance, such as spray paint, before being stacked with an adhesive, which need not be a dark shade in this embodiment, between the strips, or before being placed into the epoxy trough. In another embodiment of the present invention, the coated blackened glass sheets may be individually fastened using glue or epoxy. In another embodiment of the present invention, both the clear substance and the black layer could be formed of a suitable substance and placed, in turn, on the glass core using sputtering techniques known in the art, or deposition techniques known in the art.

Those of ordinary skill in the art will recognize that many modifications and variations of the present invention may be implemented. The foregoing description and the following claims are intended to cover all such modifications and variations.

What is claimed is:

1. A method of producing a stacked optical waveguide panel, comprising:
   coating a plurality of sheets on each of two faces with a first substance having an index of refraction lower than that of the sheets;
   placing a first coated sheet into a trough sized larger than the first coated sheet;
   filling the trough with a thermally curable epoxy;
   stacking the plurality of coated sheets within the filled trough;
   curing the epoxy;
   forming, at two opposite ends of the stack, a back face and an outlet face; and
   providing at least one reflector substantially at the back face.

2. The method of claim 1, wherein said stacking is repeated until between approximately 500 and approximately 800 sheets are stacked.

3. The method of claim 1, further comprising applying substantially uniform pressure to the stack to produce a substantially uniform level of epoxy between adjoining coated sheets.

4. The method of claim 1, wherein said curing comprises baking at 80 degrees Celsius.

5. The method of claim 1, wherein said providing comprises connecting the at least one reflector within the stack.

6. The method of claim 1, wherein said providing comprises connecting the at least one reflector outside the stack.

7. The method of claim 1, wherein the sheets are comprised of glass.

8. The method of claim 1, wherein the sheets are comprised of plastic.

9. The method of claim 1, wherein the epoxy is black.

10. The method of claim 9, wherein the first substance is clear.

11. The method of claim 1, wherein the first substance is black.

12. The method of claim 1, wherein said providing comprises embossing the at least one reflector onto the back face.

13. The method of claim 1, wherein said forming comprises sawing the stack to thereby form the back face or outlet face.

14. The method of claim 13, further comprising polishing the sawed stack with a diamond polisher.

15. The method of claim 1, wherein the back face is planar.

16. The method of claim 1, wherein the back face is curved.

17. The method of claim 1, wherein the outlet face is planar.

18. The method of claim 1, wherein the outlet face is curved.

19. The method of claim 1, further comprising providing a diffusive material between the at least one reflector and the back face.

20. The method of claim 1, wherein the at least one reflector comprises a diffusive element therewithin.

21. The method of claim 1, wherein said providing comprises applying the at least one reflector to the back face as a coating.

22. The method of claim 1, wherein said providing comprises gluing the at least one reflector to the back face.

23. The method of claim 1, wherein said providing comprises applying the at least one reflector to the back face as a reflective tape.

24. The method of claim 1, wherein said providing comprises connecting the at least one reflector to a surface of the back face.

25. A method of forming an optical waveguide panel, comprising:
- stacking a plurality of clear strips;
- placing an adhesive between each strip;
- pressing the stack;
- forming, at two opposite ends of the stack, a back face and an outlet face; and
- providing at least one reflector substantially at the back face.

26. The method of claim 25, wherein said providing comprises embossing the at least one reflector onto the back face.

27. The method of claim 25, wherein the strips are about ¾" by 40", and approximately $20/1000$" thick, in dimension.

28. The method of claim 25, wherein the stack includes about 2000 to about 3000 of the strips.

29. The method of claim 25, wherein the strips are glass.

30. The method of claim 25, wherein the strips are plastic.

31. The method of claim 25, wherein the strips are approximately 0.010"–0.020" thick.

32. The method of claim 25, wherein the adhesive is between $1/1000$" to $2/1000$" thick.

33. The method of claim 25, wherein the adhesive comprises a material having a lower index of refraction than that of the clear strips.

34. The method of claim 25, wherein the adhesive is double sided tape.

35. The method of claim 25, wherein the adhesive is black.

36. The method of claim 35, further comprising coating the clear strips on each of two faces with a cladding material, wherein the cladding material is clear.

37. The method of claim 25, further comprising coating the clear strips on each of two faces with a cladding material, wherein the cladding material is black.

38. The method of claim 25, wherein said providing comprises embossing the at least one reflector onto the back face.

39. The method of claim 25, wherein the back face is planar.

40. The method of claim 25, wherein the back face is curved.

41. The method of claim 25, wherein the outlet face is planar.

42. The method of claim 25, wherein the outlet face is curved.

43. The method of claim 25, further comprising providing a diffusive material between the at least one reflector and the back face.

44. The method of claim 25, wherein the at least one reflector comprises a diffusive element therewithin.

45. The method of claim 25, wherein said providing comprises applying the at least one reflector to the back face as a coating.

46. The method of claim 25, wherein said providing comprises gluing the at least one reflector to the back face.

47. The method of claim 25, wherein said providing comprises connecting the at least one reflector to a surface of the back face.

48. The method of claim 25, wherein the adhesive is about $1/1000$" to $2/1000$" thick.

49. The method of claim 25, wherein said pressing comprises pressing the stack with a pressure of at least 1,000 pounds.

* * * * *